United States Patent
Borkar et al.

(10) Patent No.: US 7,523,337 B2
(45) Date of Patent: Apr. 21, 2009

(54) POWER DELIVERY SYSTEM IN WHICH POWER SUPPLY AND LOAD EXCHANGE POWER CONSUMPTION MEASUREMENTS VIA DIGITAL BUS

(75) Inventors: Shekhar Borkar, Beaverton, OR (US); Tanay Karnik, Portland, OR (US); Peter Hazucha, Beaverton, OR (US); Gerhard Schrom, Hillsboro, OR (US); Greg Dermer, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 290 days.

(21) Appl. No.: 10/922,050

(22) Filed: Aug. 19, 2004

(65) Prior Publication Data

US 2006/0041763 A1 Feb. 23, 2006

(51) Int. Cl.
*G06F 1/26* (2006.01)
(52) U.S. Cl. .......................... 713/340; 702/61; 702/62; 710/104; 713/300
(58) Field of Classification Search ................ 702/61, 702/62; 710/104; 713/300, 340
See application file for complete search history.

(56) References Cited

U.S. PATENT DOCUMENTS

| 6,025,695 | A | 2/2000 | Friel et al. |
| 6,795,009 | B2 * | 9/2004 | Duffy et al. ................. 341/155 |
| 6,928,560 | B1 * | 8/2005 | Fell et al. .................... 713/300 |
| 7,062,663 | B2 * | 6/2006 | Meynard ..................... 713/320 |
| 7,313,706 | B2 * | 12/2007 | Williams et al. ............. 713/300 |
| 2004/0128101 | A1 | 7/2004 | Hermerding, II |
| 2004/0201279 | A1 * | 10/2004 | Templeton .................. 307/11 |
| 2005/0182986 | A1 | 8/2005 | Anderson et al. |
| 2005/0275382 | A1 * | 12/2005 | Stessman et al. ............ 320/143 |

FOREIGN PATENT DOCUMENTS

| EP | 1 056 206 A1 | 11/2000 |
| GB | 2341 247 A | 3/2000 |

OTHER PUBLICATIONS

Microchip Technology Inc., PIC16C7X, 1997.*
Watts, C. and Ambatipudi, R., "Dynamic energy management in embedded systems," Electronics Systems and Software, vol. 1(5), pp. 18-22, Oct./Nov. 2003.*
PowerWise Interface Specificaiton, Revision 1.0, Oct. 1, 2003.*
PCT Search Report, PCT/US2005/026938, mailed Dec. 13, 2005.
Patent Abstracts of Japan, "Method and Device fo Regulating Power Supply Voltage", JP08016260, Jan. 19, 1996.

* cited by examiner

*Primary Examiner*—Thomas Lee
*Assistant Examiner*—Albert Wang
(74) *Attorney, Agent, or Firm*—Blakely, Sokoloff, Taylor & Zafman LLP

(57) ABSTRACT

A system is disclosed. The system includes a load, a voltage regulator circuit coupled to the load a power supply, a load coupled to the power supply to receive one or more voltages from the power supply, and a digital bus, coupled between the power supply and the load. The digital bus transmits power consumption measurements from the load to the power supply and transmits power consumption measurements from the power supply to the load.

22 Claims, 5 Drawing Sheets

US 7,523,337 B2

POWER DELIVERY SYSTEM IN WHICH POWER SUPPLY AND LOAD EXCHANGE POWER CONSUMPTION MEASUREMENTS VIA DIGITAL BUS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

FIELD OF THE INVENTION

The present invention relates to computer systems; more particularly, the present invention relates to delivering power to a power sensitive system such as a computer system.

BACKGROUND

Integrated circuit components, such as central processing units (CPUs), are typically powered by a power supply located at a remote location. The power consumption of CPUs is becoming excessively high, and cost-effective cooling solutions are currently reaching the physical limits. It is important that energy converted to heat by CPU activity translates into performance. Moreover, power supply technology is reaching limits, while regulation of supply voltages within tight tolerances entails higher cost spent on decoupling and packaging.

BRIEF DESCRIPTION OF THE DRAWINGS

The invention is illustrated by way of example and not limitation in the figures of the accompanying drawings, in which like references indicate similar elements, and in which.

DETAILED DESCRIPTION

According to one embodiment, a power delivery system for a computer system is described. The power delivery system features the ability of a power supply, load, or both, to measure voltages, currents, power, and temperature and share the measurements via a unidirectional or bidirectional digital bus. In one embodiment, the measurements are carried out by sensing and sampling an analog signal, converting the signal into digital form and encoding the signal into a proper format for transmission over the bus.

The measurements may also be realized indirectly by monitoring digital control signals already present in the power supply, e.g. the output of a modulator (PWM, PFM, etc.). These control signals include information about the duty cycle and switching frequency of the power supply and allow for indirect measurement of output current, voltage, and power. In addition, existing control signals already present in the load (e.g. the clock frequency of a processor or I/O frequency) may be used to indirectly measure power consumption at the load. This shared information about output power of a power supply or input power of a load can be utilized by the power supply, the load, or both to manage and optimize DC and transient load regulation, power conversion efficiency, battery life or other aspects of the system performance.

In the following detailed description of the present invention, numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
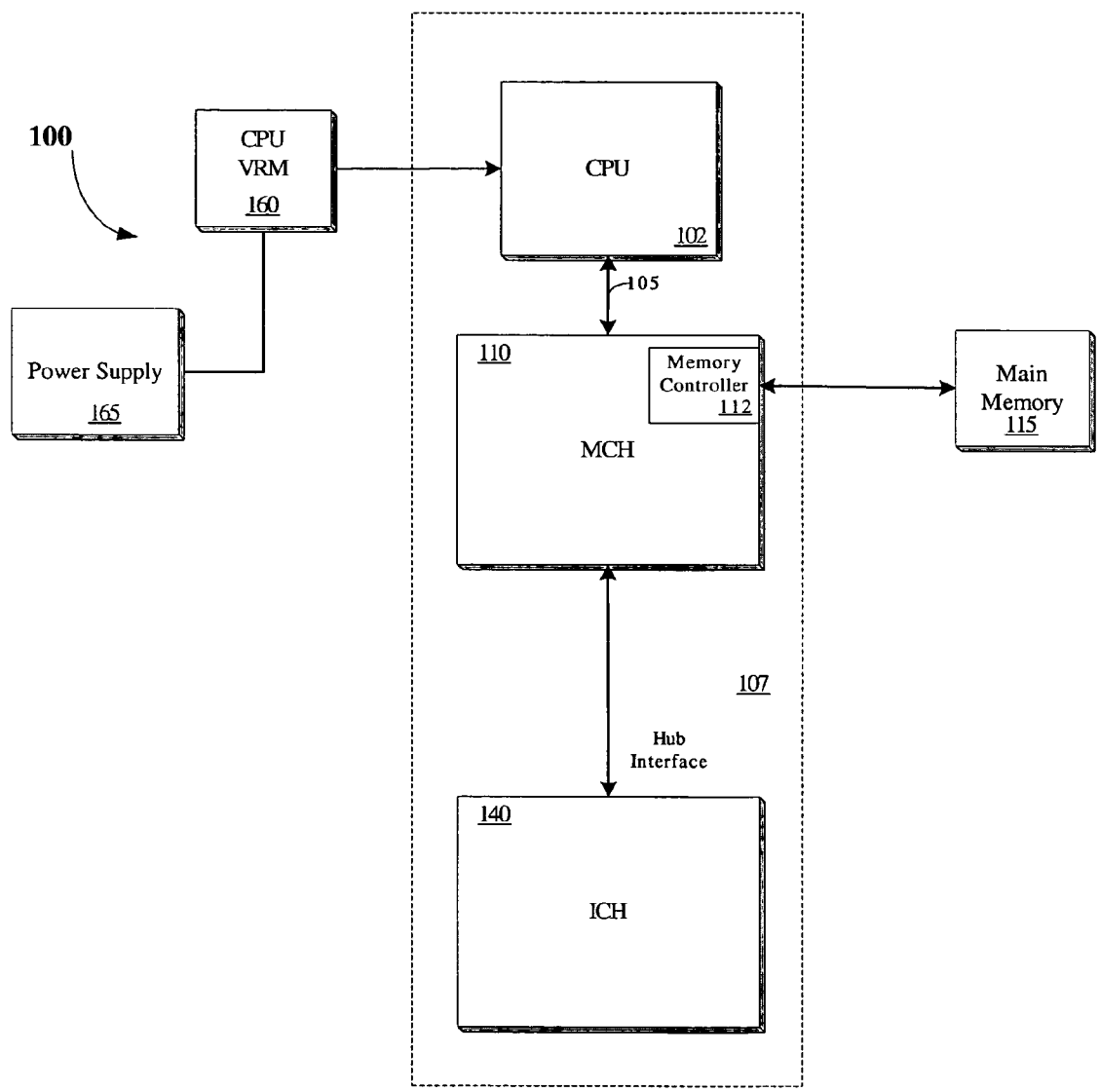
FIG. 1 is a block diagram of one embodiment of a computer system.

FIG. 1 is a block diagram of one embodiment of a computer system 100. Computer system 100 includes a central processing unit (CPU) 102 coupled to bus 105. In one embodiment, CPU 102 is a processor in the Pentium® family of processors including the Pentium® II processor family, Pentium® III processors, and Pentium® IV processors available from Intel Corporation of Santa Clara, Calif. Alternatively, other CPUs may be used.

A chipset 107 is also coupled to bus 105. Chipset 107 includes a memory control hub (MCH) 110. MCH 110 may include a memory controller 112 that is coupled to a main system memory 115. Main system memory 115 stores data and sequences of instructions that are executed by CPU 102 or any other device included in system 100. In one embodiment, main system memory 115 includes dynamic random access memory (DRAM); however, main system memory 115 may be implemented using other memory types. Additional devices may also be coupled to bus 105, such as multiple CPUs and/or multiple system memories.

Chipset 107 also includes an input/output control hub (ICH) 140 coupled to MCH 110 via a hub interface. ICH 140 provides an interface to input/output (I/O) devices within computer system 100. ICH 140 may be coupled to a Peripheral Component Interconnect bus adhering to a Specification Revision 2.1 bus developed by the PCI Special Interest Group of Portland, Oreg.

In addition, computer system 100 includes a power supply 165 and a voltage regulator module (VRM) 160, coupled to CPU 102. VRM 160 provides a regulated voltage supply to CPU 102. In one embodiment, power supply 165, VRM 160, and CPU 102 are separate discrete components, e.g. integrated circuits or printed circuit boards. However, in other embodiments, these components may be integrated by packaging, bonding, or manufacturing on the same IC. Note that in other embodiments power supply 165 may be coupled directly to CPU 102 without the implementation of VRM 160.

Figure 2:
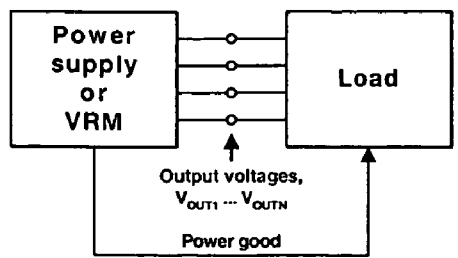
FIG. 2 is a block diagram of an exemplary power supply coupled to a voltage load.

As discussed above, the power consumption of CPUs is becoming excessively high. Currently, there are various mechanisms that attempt to increase the efficiency of power consumption. For example, FIG. 2 is a block diagram of a conventional power supply, or VRM, delivering voltage to a load. In this example, the power supply performs conditioning of output voltages. When the voltages are within specified limits, the power supply asserts a "power good" signal to notify the load that it is safe for the load to operate. Thus, the power good signal indicates that output voltages from the power supply are stable.

Figure 3:
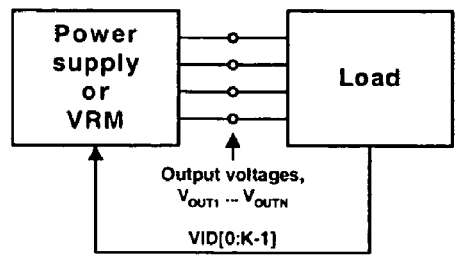
FIG. 3 is a block diagram of another example of a power supply coupled to a voltage load.

FIG. 3 is a block diagram of another conventional power supply delivering voltage to a load. In this system, the load notifies the power supply about the desired output voltage by transmitting a K-bit binary code over a parallel digital bus. This bus is commonly referred to as a VID bus. The power supply then outputs a voltage corresponding to the digital code.

Figure 4:
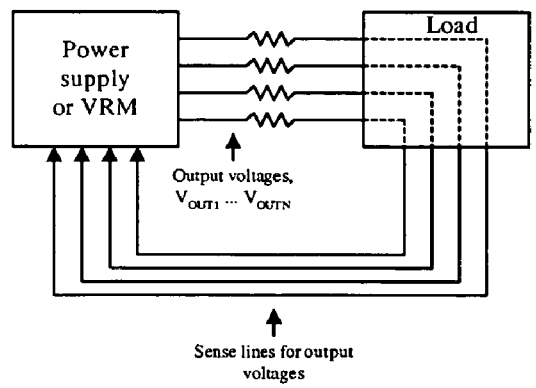
FIG. 4 is a block diagram of a further example of a power supply coupled to a voltage load.

FIG. 4 is a block diagram of yet another conventional power delivery system. In this system the power supply makes use of additional lines to sense the output voltages at the point of load. The power supply outputs voltages on the power lines that are connected to the load. When load current varies, the actual voltage at the point of load may differ from the voltage at the output terminals of the power supply because the load current induces a voltage drop on the power lines. The sense lines are not significantly loaded by current, therefore the power supply can accurately determine and regulate the actual voltages at the point of load rather than at its output terminals. The sense lines are wires connecting directly to the output voltage at the point of load and the sense terminals of the power supply.

Figure 5:
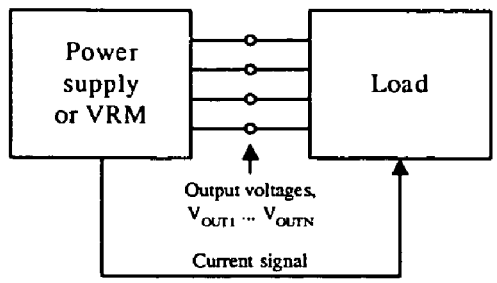
FIG. 5 is a block diagram of yet another example of a power supply coupled to a voltage load.

FIG. 5 is a block diagram of yet another conventional power delivery system. In this system the power supply provides an analog signal (voltage or current) that is proportional to the output current flowing from one of the output voltage terminals to the load. In some cases, the power supply may use such a signal internally for regulation purposes. However, it may be difficult to route an analog signal from the supply to the load in a noisy environment.

All of the above power delivery systems that are currently available are not able to efficiently manage power consumption since none of the devices (e.g., power supply, VRM or load) are able to determine how the other devices are operating. As a result, actual power management is not possible. According to one embodiment, power consumption measurements are exchanged between VRM 160 and the CPU 102 load. By exchanging measurements the load power consumption may be efficiently managed.

Figure 6:
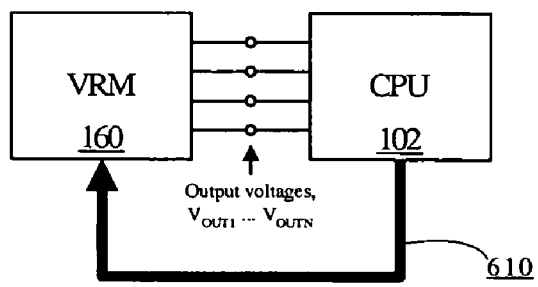
FIG. 6 is a block diagram of one embodiment of a voltage regulator module coupled to a CPU.

FIG. 6 is a block diagram of one embodiment of VRM 160 coupled to CPU 102 via a digital bus 610. In this embodiment, CPU 102 broadcasts power consumption measurements on bus 610. For example, CPU 102 measures the voltages at the point of load, converts the measured voltages into a digital signal and transmits the signal to VRM 160. In one embodiment, bus 610 is a parallel telemetry bus. However, in other embodiments, bus 610 may be implemented as a serial bus.

Figure 7:
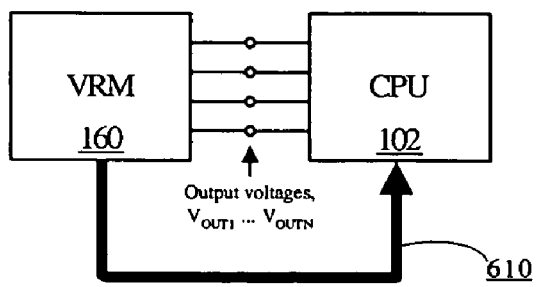
FIG. 7 is a block diagram of another embodiment of a voltage regulator module coupled to a CPU.

FIG. 7 is a block diagram of another embodiment of VRM 160 coupled to CPU 102 via a digital bus 610. In this embodiment, power consumption measurements are broadcasted over bus 610 by VRM 610 and are received at CPU 102. For example, VRM 610 measures output voltages and output currents, or power, and transmits that information to CPU 102.

Figure 8:
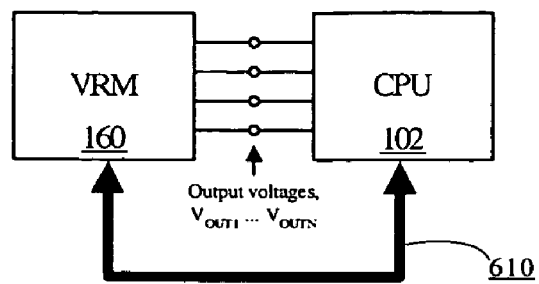
FIG. 8 is a block diagram of yet another embodiment of a voltage regulator module coupled to a CPU.

FIG. 8 is a block diagram of yet another embodiment of VRM 160 coupled to CPU 102 via a digital bus 610. In this embodiment, a bidirectional exchange of power consumption measurements occurs between VRM 160 and CPU 102. Power consumption measurements may include digitally encoded input and output voltages, currents, power, and temperature of VRM 160. In addition, the measurements may include input voltages, currents, power, and temperature of CPU 102. According to one embodiment, information may be binary encoded and discrete-valued. Thus, the amplitude of the signal may be discrete valued. For example, two different voltages can be used to represent a logic zero and one.

Figure 9:
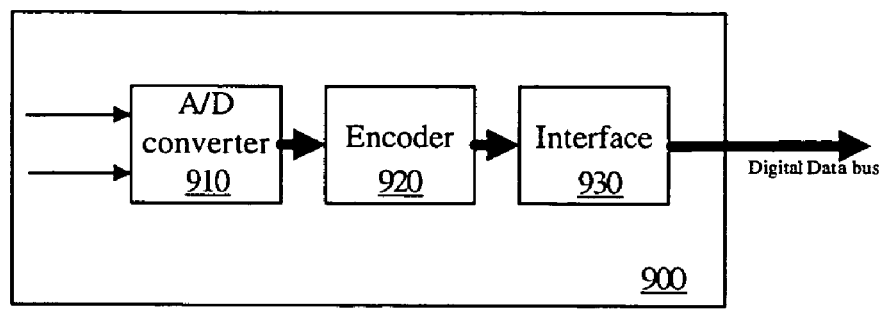
FIG. 9 is a block diagram of one embodiment of a device.

FIG. 9 is a block diagram of one embodiment of a device 900. Device 900 may be implemented as VRM 160 or CPU 102. In embodiments where power supply 165 is coupled directly to CPU 102, device 900 may also be implemented at power supply 165. Device 900 includes analog-to-digital (A/D) converter 910, encoder 920 and interface 930.

In this embodiment, power consumption measurements are derived from an analog signal digitized by A/D converter 910, encoded by encoder 920 and formatted by interface 930 so that the signal may be transmitted via digital data bus 610. In a further embodiment, A/D converter 910 outputs a digital word (e.g. a binary word) in either a parallel or serial format.

In other embodiments, other devices may be implemented instead of A/D converter 910. For instance, a voltage-to-frequency, current-to-frequency, voltage-to-time, or current-to-time converter could be used instead of A/D converter 910.

Figure 10:
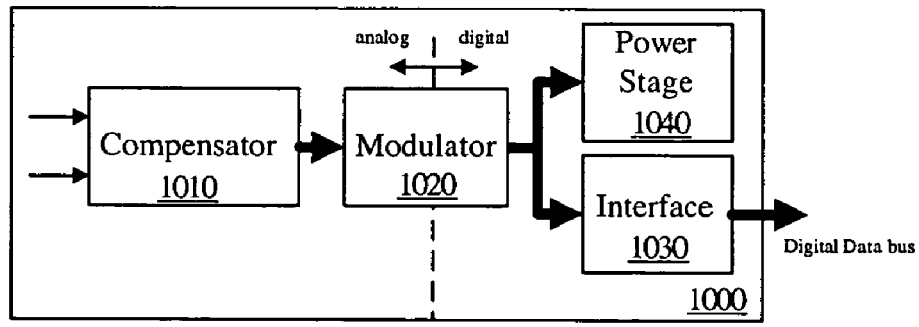
FIG. 10 is a block diagram of one embodiment of a voltage regulator module.

FIG. 10 is a block diagram of one embodiment of a device 1000 with analog control. Device 100 may be implemented as VRM 160 or power supply 165, in embodiments where power supply 165 is coupled directly to CPU 102. Device 1000 includes compensator 1010, modulator 1020, interface 1030 and power stage 1040.

In the embodiment illustrated in FIG. 10, device 1000 is a switching power supply. In switching power supplies, a control signal applied to switching devices is inherently digital (e.g., the switch can be either on or off). Modulator 1020 generates the control signal. In one embodiment, modulator 1020 is a pulse-width modulator (PWM). However, in other embodiments, modulator 1020 may be a pulse-frequency modulator (PFM), constant on time or constant off time modulator, etc.

Modulator 1020 determines the control signal based on an error signal received from compensator 1010, which senses voltages and currents at various points. According to one embodiment, the digital signal output by modulator 1020 is transmitted via digital bus 610. In switching power supplies based on various topologies (e.g. flyback, buck, boost, etc.) the digital signal from modulator 1020 includes information about the output power. Compared to device 900 described above, device 1000 does not implement an explicit A/D converter.

Figure 11:
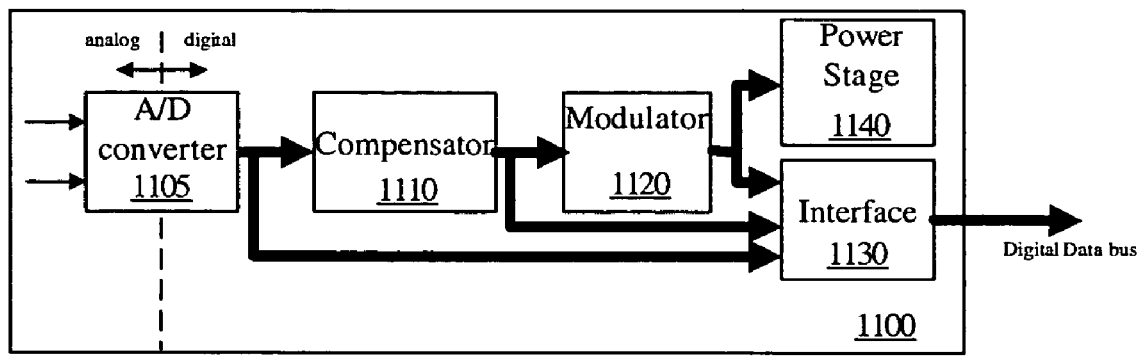
FIG. 11 is a block diagram of another embodiment of a voltage regulator module.

FIG. 11 is a block diagram of one embodiment of a device 1100 with digital control. Device 1100 may be implemented as VRM 160 or power supply 165, in embodiments where power supply 165 is coupled directly to CPU 102. Device 1100 includes A/D converter 1105, compensator 1110, modulator 1120 interface 1130 and power stage 1140. In this embodiment, compensator 1110 and modulator 1120 are digital. Therefore, any signal after A/D converter 1105 is transmitted on the digital bus for the purpose of power measurement.

Figure 12:
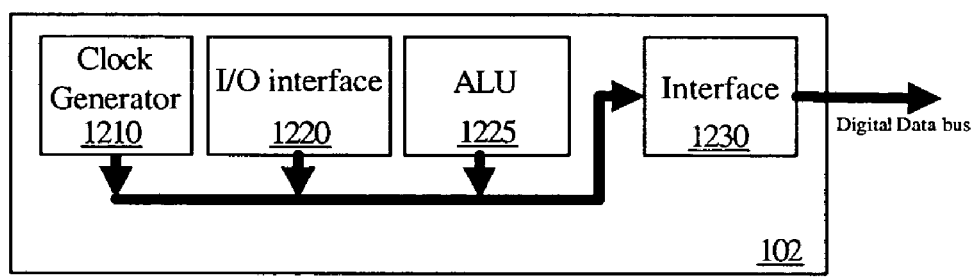
FIG. 12 is a block diagram of one embodiment of a CPU.

FIG. 12 is a block diagram of one embodiment of a CPU 102. CPU 102 includes clock generator 1210, I/O interface 1220, ALU 1225 and interface 1230. These digital blocks draw current from the voltages provided by VRM 160 or power supply 165. In a CMOS process and other technologies, power consumption is strongly correlated to the switching operation or immediate state of the CPU 102 load. Therefore, digital signals derived from for example clock frequency, I/O transfer activity, ALU 1225 activity, number of I/O bits in a specific state, etc., provide information that allow coarse or accurate estimation of power consumed by the load. These signals can be broadcasted on digital data bus 610 for the purpose of current or power estimation.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A system comprising:
   a power supply;
   one or more analog signal lines, coupled to the power supply, to transmit power from the power supply;
   a load, coupled to the one or more analog signal lines, to receive one or more voltages from the power supply: and
   a digital bus, coupled between the power supply and the load, to transmit power consumption measurements at the load from the load to the power supply and to transmit power consumption measurements from the power supply to the load;
   wherein the power supply measures values corresponding to the power consumed by the load and transmits the values to the load via the digital bus.

2. The system of claim 1 wherein the load converts a measured load voltage into a digital signal and transmits the signal to the power supply via the digital bus.

3. The system of claim 1 wherein the power consumption measurements transmitted from the load are selected from a group comprising: input voltage, output voltage, input current, output current, input power, output power and temperature.

4. The system of claim 1 wherein the power consumption measurements transmitted from the power supply are selected from a group comprising: output voltage, current, power and temperature.

5. The system of claim 1 wherein the digital bus is a serial bus.

6. The system of claim 1 wherein the digital bus is a parallel bus.

7. The system of claim 1 wherein the power supply is a voltage regulator circuit.

8. The system of claim 1 wherein the power supply comprises:
   an analog-to-digital (A/D) converter to digitize an analog signal;
   an encoder, coupled to the A/D convener, to encode the digitized signal; and
   an interface, coupled to the encoder and the digital bus, to interface with the digital bus.

9. The system of claim 1 wherein the power supply comprises:
   a compensator;
   a modulator, coupled to the compensator, to generate a control signal; and
   an interface, coupled to the modulator and the digital bus, to interface with the digital bus.

10. The system of claim 9 wherein the power supply further comprises a power stage coupled to the modulator.

11. The system of claim 9, wherein the power supply further comprises an analog-to-digital (A/D) converter coupled to the compensator and the interface.

12. The system of claim 1 wherein the load comprises:
   an analog-to-digital (A/D) converter to digitize an analog signal;
   an encoder, coupled to the A/D converter, to encode the digitized signal; and an interface, coupled to the encoder and the digital bus, to interface with the digital bus.

13. The system of claim 1 wherein the load comprises:
   a clock generator;
   an input/output (I/O) interface;
   an arithmetic logic unit (ALU); and
   an interface, coupled to the digital bus.

14. A method comprising:
   delivering one or more voltages from a power supply to a load;
   receiving power consumption measurements at the load from the load at the power supply via a digital bus; and
   transmitting power consumption measurements from the power supply to the load via the digital bus;
   wherein further comprising the power supply measuring values corresponding to a magnitude of power consumed by the load prior to transmitting the power consumption measurements from the power supply to the load.

15. The method of claim 14 further comprising:
   converting the power consumption measurements from an analog signal to a digital signal at the load; and encoding the digital signal.

16. The method of claim 14 further comprising modulating a value to generate a control signal.

17. A computer system comprising:
   a power supply;
   a voltage regulator module (VRM), coupled to the power supply;
   a central processing trait (CPU), coupled to the VRM, to receive one or more voltages from the VRM; and
   a parallel telemetry bus, coupled between the VRM and the CPU, to transmit power consumption measurements at the CPU from the CPU to the VRM and to transmit power consumption measurements from the VRM to the CPU;
   wherein the VRM measures values corresponding to the power consumed by the CPU and transmits the values to the CPU via the bus.

18. The computer system of claim 17 wherein the CPU converts a measured load voltage into a digital signal and transmits the signal to the VRM via the bus.

19. The computer system of claim 17 wherein the VRM measures values corresponding to the power consumed by the CPU and transmits the values to the CPU via the bus.

20. The computer system of claim 17 wherein the VRM comprises:
   an analog-to-digital (A/D) converter to digitize an analog signal;
   an encoder, coupled to the A/D converter, to encode the digitized signal; and
   an interface, coupled to the encoder and the digital bus, to interface with the digital bus.

21. The computer system of claim 17 wherein the CPU comprises:
- an analog-to-digital (A~D) converter to digitize an analog signal;
- an encoder, coupled to the A/D converter, to encode tile digitized signal; and
- an interface, coupled to the encoder and the digital bus, to interface with the digital bus.

22. The computer system of claim 17 wherein the CPU comprises:
- a clock generator;
- an input/output (I/O) interface;
- an arithmetic logic unit (ALU); and
- an interface coupled the digital bus.

* * * * *